Jan. 25, 1966          F. RIEL          3,231,450

ADHESIVE STRIPS AND BONDED JOINTS CREATED FROM THE SAME

Filed May 21, 1962

INVENTOR.
FRANK JAMES RIEL
BY

United States Patent Office 3,231,450
Patented Jan. 25, 1966

3,231,450
ADHESIVE STRIPS AND BONDED JOINTS
CREATED FROM THE SAME
Frank Riel, San Diego, Calif., assignor to Whittaker
Corporation, a corporation of California
Filed May 21, 1962, Ser. No. 196,073
6 Claims. (Cl. 161—36)

This invention pertains to new and improved adhesive strips for use in creating bonded joints, and to the joints produced through the use of these strips.

It is common practice to form bonded joints by securing overlapped surfaces of two members to one another through the use of a single, homogeneous adhesive. Overlapped, bonded joints of this general variety are widely used for many different purposes. They are frequently used in order to bond or connect two sheets of rigid material. If a joint of this type connecting two sheets of rigid material is subjected to tension extending across it, the stresses within the joint will not be uniform, but will be greatest at the edges of the joint, and will be at a minimum at the center of the joint.

Because of this factor, the strength of the overlapped type joint connecting two sheets of rigid material is not determined merely by the total area of the overlap where a conventional single, homogeneous adhesive is present. Different expedients have been proposed in order to minimize the effects of such unequal stresses and in order to provide an adhesive bond in an overlapped type joint having as great a yield strength as possible for a specific area of the bond.

As an example of this, it has been suggested to form the bond between two overlapped sheets of rigid material utilizing a series of separate parallel strips of different adhesives, these adhesives being chosen so as to approximate the properties desired in different regions of a bond according to the stresses present in these regions. While this strip-type procedure gives a rough type of approximation of desired characteristics in a bonded joint, it is not considered to be satisfactory for several reasons. With this strip-type of bonded joint, the properties of the bond vary across the width of the bond in a step-wise manner, and because of this the ultimate yield strength of the bond is not considered to reach a desired high value. Further, this type of procedure is relatively difficult from a manufacturing point of view because of problems in satisfactorily forming and using separate strips of different adhesives so that these strips are properly located with respect to one another.

An object of the present invention is to provide adhesive strips for use in creating bonded joints which strips are constructed in such a manner as to provide for the unequal stresses at the edges of these joints. A related object of the present invention is to provide adhesive strips which can be used so as to overcome various disadvantages and limitations of joints created from separate strips of different adhesives such as are briefly indicated in the preceding paragraph. Another related object of the present invention is to provide joints created from adhesive as herein described which have a greater yield strength than joints of a corresponding size created using a single, homogeneous adhesive.

A still further object of the invention is to provide an adhesive strip and method of making same which exhibits continuously variable strength characteristics along its length.

These and various other objects of the present invention will be apparent to those skilled in the art of adhesive joints from a detailed consideration of the remainder of this specification including the appended claims and the accompanying drawing in which:

Figure 1:
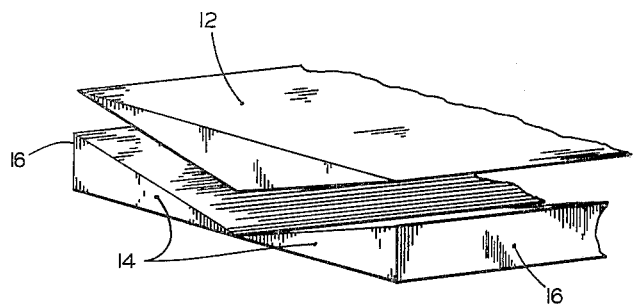
FIGURE 1 is an enlarged perspective view indicating the nature of an adhesive strip formed in accordance with this invention.

The accompanying drawing is primarily intended so as to clearly illustrate the character of adhesive strips and joints in accordance with this invention. From a careful consideration of this drawing and of the remainder of this specification it will be apparent that the drawing does not illustrate any specific strip or joint and that it is not to be taken as suggesting the dimensions for any specific adhesive strip or joint falling within the scope of this invention.

The specific geometry of the adhesive tape will be determined by the strength characteristics desired. For example, the strength variation across the length of the adhesive strip shown in the attached drawings is linear. Certain applications may require a logarithmic variation in the strength of the adhesive across its length and accordingly, the cross sectional area of the strip would be designed in a respectively logarithmic manner.

As an aid to understanding this invention, it can be stated in essentially summary form that it concerns adhesive strips (as are indicated in the preceding) which are employed so as to bond two overlapped members to one another in order to form a bonded joint between these members. Each of these strips includes a relatively elastic adhesive and a relatively rigid adhesive, and these adhesives are located so that their concentrations vary throughout the width of the strip between its edges. These concentrations are varied so as to provide in joints falling within the scope of this invention a variation in physical properties necessary in order to achieve a comparatively high yield strength with a minimum of difficulty.

In FIGURE 1 of the drawing, there is shown a composite adhesive strip of the present invention which includes a strip 12 of a relatively rigid adhesive composition and other strips 14 of a relatively elastic adhesive composition. The strip 12 has essentially the shape of a relatively flat isosceles triangle and the strips 14 have the shape of relatively flat right angle triangles, the heights of which are the same as the height of the strip 12 and the bases of which are one-half as long as the base of the strip 12. These strips 12 and 14 are assembled together as hereinafter described in the composite strip so that the composite strip has a relatively flat, elongated rectangular cross-sectional configuration.

The dimensions of the composite strip may be varied within comparatively wide limits depending upon any specific application or use for this strip. In general, the height or thickness of the composite strip should fall within the range of from about five to about ten mils since, if thinner strips are employed, there is a tendency to have insufficient adhesive in a bonded joint for satisfactory bonding purposes, and since thinner strips than this are relatively difficult to handle. If the composite strip is significantly thicker than within this range, there is a tendency for an excess of adhesive to be employed. The width of the composite strip between its side edges 16 can be varied within comparatively wide limits depending upon the desired overlap area required in any specific bonded joint. In general, the greater the distance between the side edges 16, the greater the strength of the joint created with the strip.

Similarly, this composite strip may be of any desired length required for any specific application.

From a careful consideration of FIGURE 1, it will be apparent that the individual strips 12 and 14 are arranged so as to obtain a variation in the concentration of different adhesive materials in the composite strip. In the strip there is a maximum amount of a relatively elastomeric adhesive at the edges 16, and the concentration of this elastomeric adhesive decreases to a minimum at the center of the composite strip midway between the edges 16. In a related manner, the concentration of the relatively rigid adhesive in the composite strip is at a maximum in the center of this strip and decreases to a minimum at the edges 16. If desired, the individual strips 12 and 14 may be curved slightly along their adjacent surfaces so as to provide other than a pure linear variation in the concentrations of different types of adhesives used in these strips, although this is not normally considered necessary.

It is possible to use comparatively wide latitude in selecting the two different adhesives or adhesive compositions employed in the strips 12 and 14 in the composite strip. These adhesives should be compatible with one another in the sense that they do not react with one another at room temperature and in the sense that they do not completely mix, blend or flow together so as to form a homogeneous mass either under (1) the conditions encountered during the manufacture of the composite strip, or (2) during the use of this strip in creating a joint as herein described to any significant extent affecting the physical properties of the adhesive bond in such a joint. These adhesives must, of course, be capable of bonding to one another.

The term "relatively rigid adhesive" as used herein is employed to designate comparatively brittle adhesives such as various common epoxy and phenolic resins which are capable of less than five percent elongation when cured. Various elastomeric adhesives are, of course, capable of elongating considerably more than common epoxy and phenolic resins. Satisfactory results can be achieved in accordance with this invention when the amount which the relatively elastic adhesive will elongate under tension is significantly greater than the amount which the relatively rigid adhesive can elongate under the same conditions. Favorable results have been achieved using elastomeric adhesive compositions which, when cured, will elongate more than twice as much as the relatively rigid adhesive employed.

The strips 12 and 14 can be formed out of a wide variety of different known adhesive compositions of a conventional variety. Such compositions will be apparent to those skilled in the adhesive art from a study of various commercially available products. Such products are indicated in various texts such as the text "Adhesive Guide," by Joyce Hurd, Palmerton Publishing Company, the text "Adhesive Bonding of Metals," by George Epstein, Reinhold Publishing Company, and the text "The Science of Adhesive Joints," by J. J. Bikerman, Academic Press.

Satisfactory joints have been formed from strips such as the composite strip in which the individual strips corresponding to the strip 12 previously described have been created utilizing relatively rigid epoxy adhesives as are described in the co-pending patent application Serial No. 828,355 entitled "Novel Epoxide-Type Resin Compounds and Process for Making Same" and using a relatively elastomeric adhesive an epoxy-nylon combination adhesive as described in the co-pending patent application Serial No. 40,222 entitled "Adhesive and Method for Forming." The entire disclosures of these co-pending applications are incorporated herein by reference for the purpose of amplifying the present disclosure so as to eliminate the necessity for repeating in this specification material which is set forth in these co-pending applications.

Various other adhesive combinations can, of course, be employed in creating complete strips such as the composite strip previously described. Thus, for example, satisfactory results can be achieved using relatively rigid phenolic resin adhesives together with relatively elastic adhesives or adhesive blends such as known phenolic resin-nitrile rubber blends, phenolic resin-neoprene elastomer blends, phenolic resin-vinyl resin blends utilizing polyvinyl alcohol cross line with formaldehyde or the like. In all of these cases, the elasticity of the elastic adhesive or adhesive blend can be varied by varying the amount of the non-phenolic resins utilized. Similar systems based upon the use of epoxy resins can be employed together with a conventional epoxy resin serving as a relatively rigid composition.

Figure 3:
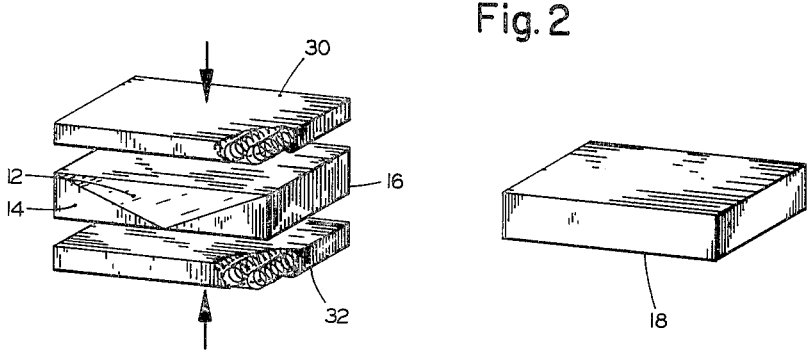
FIGURE 3 is a perspective view of the structure used in making the adhesive strip.
Figure 4:
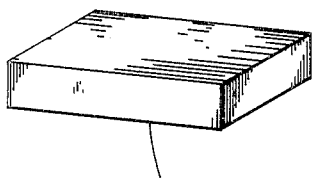
FIGURE 4 is a perspective view of a strip of adhesive which has been pre-cured.

Any of such materials may be formed into the shapes of the strips 12 and 14 employed in a composite strip as herein described through the use of conventional techniques as are presently employed in creating films or strips of adhesives. Thus, for example, known calendering, coating, and casting techniques may be employed in order to create the various individual strips such as the strips 12 and 14. A composite strip as shown in FIGURE 4 can be made by the method shown in FIGURE 3. More specifically, strips of a rigid adhesive 12 and an elastomeric adhesive 14 of proper design configurations can be placed between two press plates 30, 32 having heating means therein, as shown in FIGURE 3. When the films 12 and 14 are subjected to this pressure and heat, both films unite to form a composite film as shown at 18 in FIGURE 4, said composite film having a variable strength characteristic across its width.

Figure 2:
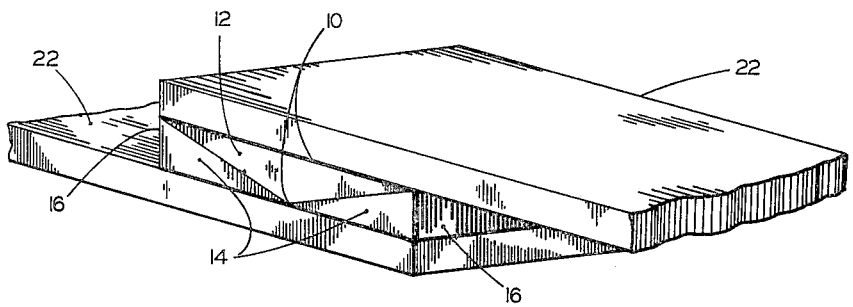
FIGURE 2 is a view similar to FIGURE 1 showing the nature of a joint in accordance with this invention formed from a strip of the type indicated in FIGURE 1.

When a strip such as a strip 18 has been created, it may be used in creating a complete joint such as the joint 10 indicated in FIGURE 2 of the drawing through the use of various conventional techniques and operations. Thus, for example, the joint 10 may be conveniently created by positioning two sheets of metal 22 as indicated in the drawing so that these sheets are overlapped and so that a strip 18 as previously described is positioned within the entire overlapped area. At this point heat and pressure in accordance with established techniques can be applied to the sheets 22 in order to cure the adhesives in the strips 12 and 14, causing formation of adhesive bonds in the complete joint 10. In this joint the adhesives within the strips 12 and 14 will remain substantially in the orientation in which they are found in the complete strip 18.

Thus, in a joint 10 at the edges of this joint the adhesive will consist primarily of relatively elastic material, and the concentration of the material will gradually decrease from each of these edges toward the center of the joint. In this same manner, the concentration of relatively rigid adhesive in the joint 10 will decrease from a maximum at the center of the joint to a minimum adjacent to the edges of it. As a consequence of this, there will be a relatively uniform gradation in the physical properties of the joint toward its edges because of the nature of the adhesives utilized, a joint such as the joint 10 will have a comparatively high strength.

From a detailed consideration of the preceding, it will be realized that adhesive strips and joints as herein described meet a need in the adhesive field which has not been satisfied by prior work in this field, and that these strips and joints may be easily and conveniently created and utilized so as to achieve effective results. Because of the nature of this invention, it is to be considered as being limited solely by the appended claims forming a part of this disclosure.

I claim:

1. A bonding strip for joining members which develop unequal stresses among their mating surfaces comprising an integrated adhesive strip which includes:
   strips of rigid and elastic uncured adhesives,
   said rigid adhesive being capable of less than five percent elongation when cured, said elastic adhesive being capable of more than ten percent elongation when cured,
said integrated strip having edges,
the concentration of said elastic adhesive being greatest at the edges of said integrated strip and continuously decreasing gradually toward the center of said integrated strip,
the concentration of said rigid adhesive being greatest at the center of said integrated strip and decreasing gradually toward the edges of said integrated strip.

2. A bonded joint which includes:
two overlapped members; and
an integrated adhesive strip located between adjacent surfaces of said members,
said integrated adhesive strip including strips of initially uncured rigid and elastic adhesives,
said rigid adhesive being capable of less than five percent elongation,
said elastic adhesive being capable of more than ten percent elongation,
said integrated strip having edges,
the concentration of said elastic adhesive being greatest at the edges of said integrated strip and continuously decreasing gradually toward the center of said integrated strip,
the concentration of said rigid adhesive being greatest at the center of said integrated strip and continuously decreasing gradually toward the edges of said integrated strip,
said rigid and elastic adhesives being cured and bonded to one another and to the adjacent surfaces of said members.

3. A composite adhesive strip which includes:
a strip of a rigid adhesive composition in an uncured state having the shape of a flat isosceles triangle and strips of an elastic adhesive composition in an uncured state having the shape of right angle triangles,
the bases of which are one-half as long as the base of the strip of a rigid composition,
the heights of which are the same as the height of said strip of rigid composition,
said strips of rigid and elastic adhesive compositions being located with respect to one another so that their diagonal sides are against one another so that said complete adhesive strip has a flat, elongated rectangular cross-sectional configuration.

4. A composite adhesive strip as defined in claim 3 wherein said elastic adhesive composition is capable of more than twice the elongation of said rigid adhesive composition.

5. A bonded joint which includes:
two overlapped rigid sheets; and
a composite adhesive strip located between the adjacent surfaces of said sheets,
said composite adhesive strip including a strip of a rigid adhesive composition having the shape of a flat isosceles triangle and strips of an elastic composition having the shape of right angle triangles,
the bases of which are one-half as long as the base of the strip of a rigid composition,
the heights of which are the same as the height of said strip of rigid composition,
said strips of rigid and elastic adhesive compositions being located with respect to one another so that their diagonal sides are against one another so that said complete adhesive strip has a flat, elongated rectangular cross-sectional configuration,
said rigid and said elastic adhesives being bonded to one another and to the adjacent surfaces of said sheets.

6. A bonding strip for joining members which are capable of developing unequal stresses along their mating surfaces in a first direction, said bonding strips consisting of an initially uncured relatively flexible adhesive having a continuously decreasing cross-sectional area extending in said first direction, and a second strip of an initially uncured relatively rigid adhesive having a continuously increasing cross-sectional area extending in said first direction, said first and second strips being bonded together to form certain composite adhesive whereby said composite adhesive strip has continuously variable adhesive characteristics along said first direction.

References Cited by the Examiner
UNITED STATES PATENTS

| 1,296,114 | 3/1919 | Perry | 161—116 |
| 1,511,459 | 10/1924 | Gibson | 161—36 |
| 2,748,042 | 5/1956 | Borgese | 161—166 |
| 2,751,321 | 6/1956 | Sans | 161—38 |
| 3,107,195 | 10/1963 | Stegler et al. | 156—309 |

EARL M. BERGERT, *Primary Examiner.*

DOUGLAS DRUMMOND, *Assistant Examiner.*